3,123,562
DUAL PURPOSE CUTTING OIL
Dennis F. Hallowell, Jr., Ogden, Utah, assignor to Richfield Oil Corporation, Los Angeles, Calif., a corporation of Delaware
No Drawing. Filed Dec. 7, 1959, Ser. No. 857,548
3 Claims. (Cl. 252—33.6)

This invention relates to cutting fluids and more particularly relates to compounded cutting fluids which will function either as straight mineral cutting oils or as water dispersible cutting fluids.

In the various machining operations there are basically two types of cutting fluids utilized. Machining processes involving high rubbing speeds wherein excessive heat is generated, require a cutting fluid which has good heat conductivity. Hence for high heat generating operation such as cutting and grinding it has heretofore been common practice to use as a cutting fluid a water-oil mixture since water is inherently a good heat transfer agent. This type of cutting fluid is known as a "soluble oil" although the oil does not dissolve in the water but rather forms an emulsion therewith.

In contrast with processes utilizing high rubbing speeds, processes involving high unit pressures such as broaching, drilling, threading, and reaming, require cutting fluids having optimum lubrication and anti-welding qualities, and the heat transfer properties are a secondary consideration. These latter requirements are most generally met with a straight mineral oil. Straight mineral oils do not have the good water-emulsification properties found in the "soluble oils." However, they possess superior extreme pressure properties.

Various additives have been compounded for soluble oils and straight mineral oils to enhance their respective properties. For example, it is well known in the cutting fluid art to add sulfur and chlorine in various forms to improve the surface conditions of the metal involved. Fatty oils, fatty acids, soaps, esters, and many other substances have also been compounded for use in cutting fluids and other lubricants. It would be highly desirable for a single cutting fluid additive to function as a metal wetting agent, a corrosion inhibitor, and an extreme pressure agent. In soluble oils, it would also be desirable for the additive to act as an emulsifier. Heretofore, it has been necessary to add three or four additives to impart these several important cutting fluid properties. No one cutting fluid has been successfully developed for use as both a straight mineral oil and a soluble oil. Since soluble oils are more expensive than straight mineral oils, it has not been economical to use them interchangeably as straight mineral cutting oils. Also, the addition of an extreme pressure additive to a soluble oil to make it suitable for use as a straight mineral oil would further increase the cost of the resulting dual-purpose cutting fluid. On the other hand, emulsifiers and corrosion inhibitors would have to be added to straight mineral oils to render them suitable for dual purpose use.

Therefore, it is the object of my present invention to provide a dual-purpose cutting fluid which can be used either as a straight mineral oil or as a soluble oil.

It is also an object of this invention to provide a cutting fluid additive capable of rendering a suitable oil useful as either a straight mineral cutting oil or a soluble cutting oil.

It is a further object of this invention to provide a single multi-purpose oil additive for use in applications requiring either a straight mineral oil or a water-dispersible oil.

It is a further object of my present invention to provide a single compounded additive capable of performing the functions of four individual additives. Other objects and a fuller understanding of my invention can be had by reference to the following description of my invention taken in conjunction with the appended claims.

Briefly stated, my invention relates to a dual-purpose cutting fluid useful as both a straight mineral oil and a soluble oil by the incorporation of the reaction product of a relatively long-chain fatty acid mixture with free sulfur, naphthenic acid and mixed alkylolamines in a suitable oil base.

I have discovered that a combination of commercially available relatively long-chain organic acids reacted with selected commercial substituents, that is, flowers of sulfur, mixed alkylolamines and naphthenic acids when mixed with a conventionally treated mineral oil produces a compounded oil suitable for use as a soluble oil and a straight mineral oil cutting fluid. The addition of a single substituted additive imparts to my new dual-purpose cutting fluid, excellent emulsification, extreme pressure, corrosion inhibition and metal wetting properties. Formerly it was necessary to include four individual constituents to perform the functions performed by my one substituted compound.

The principal components of my additive may be either an unsaturated organic fatty acid such as a tall oil product, or chlorohydroxy stearic acid. Tall oil is a natural mixture of rosin acids and fatty acids obtained by acidifying the black liquor skimmings of the alkaline paper pulp industry. Refined tall oil is a purified form of the natural product from which impurities, color, and odor have been removed by acidification or solvent extraction. Alternatively, crude tall oil may be distilled to not only remove impurities but also to produce fractions of varying composition. One such fraction is called tall oil fatty acids and is composed principally of fatty acids related to oleic acid with less than 10 percent of rosin acids. For use in my dual-purpose cutting fluid I have found that either the refined tall oil or the tall oil fatty acids are suitable as the substituted component. For example, I prefer to use either "Facoil CB," a solvent refined tall oil produced by the National Southern Products Corporation or "Acintol FA–1," a tall oil fatty acids product of the Arizona Chemical Company. The compositions and typical properties of the above named proprietary compounds are given in Tables I and II below:

TABLE I

*Analysis of a Solvent Refined Tall Oil, e.g., "Facoil CB"*

| | |
|---|---|
| Specific gravity, 25° C | 0.9763 |
| Viscosity @ 210° F., SUS | 118.5 |
| Viscosity, Gardner-Holdt | V–Z |
| Flash point, COC ° F | 395 |
| Fire point, COC ° F | 440 |
| Color, Hellige varnish scale (Gardner-Holdt, 1933) | 10–12 |
| Acid number | 166.3 |
| Saponification number | 174.2 |
| Iodine number (Wijs) | 142.5 |
| Rosin acid number | 84.4 |
| Moisture percent | 0.24 |
| Ash do | 0.003 |
| Fatty acids do | 47.8 |
| Rosin acids do | 45.4 |
| Sterols do | 6.60 |

TABLE II

*Analysis of Commercial Tall Oil Fatty Acids, e.g., "Acintol FA-1"*

| | |
|---|---|
| Specific gravity, 25° C. | 0.9065 |
| Viscosity @ 100° F., SUS | 100 |
| Viscosity, Gardner-Holdt | A |
| Flash point, Open Cup °F | 380 |
| Fire point, Open Cup °F | 415 |
| Color, Gardner, 1933 | 8 |
| Acid number | 191 |
| Saponification number | 195 |
| Iodine number (Wijs) | 135 |
| Composition: | |
|   Moisture | None |
|   Ash | <0.001 |
|   Rosin acids percent | 4.0 |
|   Unsaponifiables do | 4.0 |
|   Fatty acids (total) do | 92 |
|     Linoleic, conjugated do | 8.0 |
|     Linoleic, nonconjugated do | 36.0 |
|     Oleic do | 50.0 |
|     Saturated do | 6.0 |

The naphthenic acids used in my invention are commercial grade, for example, petroleum naphthenic acids. Petroleum naphthenic acids are generally not identified by specific chemical composition or structure since they are a mixture of acids produced in part by oxidation of certain readily oxidized cycloparaffins (naphthenes) during distillation and other refinery operations. In the petroleum industry, naphthenic acids are identified by the acid number rather than chemical formulae or composition. The acid number of a substance is defined as 1000 times the number of milligrams of potassium hydroxide required to neutralize one gram of the substance. Naphthenic acid is a necessary ingredient in my present invention only when the principal fatty acid material (e.g., tall oil fatty acid or chlorohydroxy stearic acid) has a low acid number that is below about 170 to 190. It is added primarily to increase the emulsion stability by forming alkylolamine naphthenate soaps. When the fatty acid constituent has a relatively high acid number i.e., above 170 to 190, the naphthenic acids are not necessary. The specification for 239 Super Refined (Richfield Oil Corporation) naphthenic acid is given in Table III.

TABLE III

*230 Super Refined Naphthenic Acid (Richfield Oil Corporation)*

| Product | Spec. | Typical |
|---|---|---|
| Gravity, °API | | 13.0. |
| Specific Gravity, 60/60° F | | 0.979. |
| Neutral Oil, Vol. Percent | 7 Max | 6.3. |
| Viscosity at 100° F., SUS | | 478. |
| Viscosity at 210° F., SUS | | 52.0. |
| Color, NPA | 2 | 1½. |
| Color Stability | 4 Max | 3. |
| Corrosion, Silver Strip | Neg. | Neg. |
| Acid Number | 230 Min | 230. |
| Flash, P.M. °F | | |
| Water, Vol. Percent | 0.1 Max | Trace. |

It has been found advantageous to use in my dual purpose cutting fluid, a commercial alkylolamine mixture such as the bottoms available from distillation processes used to separate the mono, di, and tri isopropanolamine. The particular mixture used contained approximately 10–15% mono, 40–50% di, and 40–50% tri isopropanolamines. The purpose of the alkylolamine constituent is to neutralize the fatty acid material which provides a neutralized reaction product having excellent emulsion stability properties.

Flowers of sulfur are preferably added in approximate stoichiometric amounts to react with the unsaturated fatty acids in the tall oil products at the double bond(s). The presence of sulfur in excess of these stoichiometric amounts should be avoided since it would tend to cause corrosion of the metal parts contacted by the cutting fluid.

Chlorohydroxystearic acid may be employed in place of the sulfurized refined tall oil in my dual-purpose cutting oil. My preference is to use a commercial mixture of 9 chloro, 10 hydroxystearic acid and 10 chloro, 9-hydroxystearic acid. With the use of this saturated fatty acid it is not necessary to sulfurize since the chlorine substituent lends good extreme properties to the final product.

My dual-purpose cutting fluid can either be compounded in situ or prepared as an additive which can subsequently be added to a suitable mineral base oil as desired. In this latter situation it may be desirable to add a small amount of the base oil initially as a starting oil to reduce the viscosity of the sulfurized additive. Although I chose to neutralize a mixture of naphthenic acids and the principal fatty acid constituent with mixed isopropanolamines before sulfurizing the neutralized produce, the fatty acid constituent could alternatively be sulfurized before neutralization with the isopropanolamines. My dual-purpose cutting oil should contain, in the compounded cutting oil, approximately 10% of my additive and preferably at least 10% additive.

The following specific examples are illustrative of the compositions of the present invention, but it should be understood that my invention is not to be limited thereto.

EXAMPLE I

A cutting oil additive (Compound #1) was prepared by adding 60 parts "Facoil CB" to 12.5 parts naphthenic acid and 17.5 parts mixed isopropanolamines to a mixing receptacle and heating to 260° F. At this temperature 10 parts of sulfur was added and the temperature raised to 340° F. and held for 45 minutes. The heated mix was then cooled to 250° F. and blown with steam for 10 minutes to remove hydrogen sulfide. After further cooling to 200° F., the mass was blown with air for 10 minutes to further remove hydrogen sulfide and the mass was checked with lead acetate paper to assure complete removal of hydrogen sulfide. 15 parts of the above reaction product was added to 85 parts of a 100 SUS. (100° F.) western conventionally treated pale oil and dispersed therein. The composition of the compounded cutting fluid is shown in Table IV.

TABLE IV

*Typical Composition—Compound #1*

| | Percent |
|---|---|
| Base oil (percent vol.): W-2100 | 100 |
| Composition (percent wt.): | |
|   Base oil | 80.0 |
|   Facoil CB | 12.0 |
|   Sulphur | 2.0 |
|   Mixed isopropanolamines | 3.5 |
|   Naphthenic acid (230 AN) | 2.5 |
| Addends: | |
|   Anti-Foam Agent A | 0.005 |
|   Compound 40-R-4711 | 0.10 |

An anti-foam agent such as Dow Corning's silicone material "Anti Foam Agent A" may be added to suppress foaming of the soap in the emulsion. In order to mask the odor of the naphthenic acids, amines, and sulfurized substituents, a masking compound such as Dodge and Olcott Company's (New York) compound 40-R-4711 was added.

The above compounded cutting oil was tested as a soluble oil and as a non-aqueous cutting oil. The comparative test results are found in Table VII.

EXAMPLE II

A cutting oil additive (Compound #2) was prepared by reacting 48 parts of "Actinol FA-1" and 26 parts naphthenic acid with 21 parts mixed isopropanolamines and sulfurizing the product with 5.5 parts of sulfur in a manner similar to Example I. Fifteen parts of the sulfurized product were added to 85 parts of a 100 SUS conventionally treated western pale oil. The composition of the resulting cutting fluid is shown in Table V below and the comparative test results are tabulated in Table VII below.

TABLE V
*Compound #2*

|  | Percent |
|---|---|
| Base oil (percent vol.): W-2100 | 100 |
| Composition (percent wt.): |  |
| Base oil | 80.0 |
| Actinol FA-1 | 9.5 |
| Naphthenic acid (230 AN) | 5.2 |
| Sulfur | 1.1 |
| Mixed isopropanolamines | 4.2 |

EXAMPLE III

A dual-purpose cutting fluid (Compound #3) was prepared in situ by mixing 10 parts chlorohydroxystearic acid and 4 parts naphthenic acid (230 AN) with 4 parts of mixed isopropanolamines in 82 parts of a 100 SUS (100° F.) conventionally treated western pale oil. This mixture was stirred until clear and then heated to 250° F. for ½ hour to drive off the water of reaction. The composition of the resulting compound is shown in Table VI and the comparative test results in Table VII.

TABLE VI
*Compound #3*

|  | Percent |
|---|---|
| Base oil (percent vol.): W-2100 | 100 |
| Composition (percent wt.): |  |
| Base oil | 82 |
| Chloro-hydroxystearic acid | 10 |
| Naphthenic acid (230 AN) | 4 |
| Mixed isopropanolamines | 4 |

In the standard cutting fluid tests, the results of which are represented in Table VII the cutting fluid compositions of Examples I, II, and III were tested straight (test specimens 3, 5, and 7 respectfully) and emulsified 20 to 1 (test specimens 4, 6, and 8 respectfully). Test specimens (1) and (2) run for comparison purposes are standard commercial cutting fluids. From this comparative data it is apparent that the dual-purpose cutting fluids of the present invention is unexpectedly superior in corrosion inhibition, extreme pressure properties, and tool life.

Having fully described my invention, it is to be understood that I do not wish to be limited to the particular embodiments set forth, but my invention is of the full scope of the appended claims.

TABLE VII

| | Cutting Fluid Test Specimens | | | | | | | |
|---|---|---|---|---|---|---|---|---|
| | 1 | 2 | 3 | 4 | 5 | 6 | 7 | 8 |
| | Soluble Oil [1] DO 20-1 emulsion | Cutting Oil [2] 4D | Compound #1 Neat | Compound #1 20-1 emulsion | Compound #2 Neat | Compound #2 20-1 emulsion | Compound #3 Neat | Compound #3 20-1 emulsion |
| ASTM-D665-54 Turbine Oil Rust Test (Sea Water) | Fail | Fail | Pass | Pass | Pass | Pass | Pass | Pass |
| Static Water Drop Test | | | Pass | | Pass | | Pass | |
| Richfield Method, Static Humidity Test, Aqueous Solution | Fail | Fail | Pass | Pass | Pass | Pass | Pass | Pass |
| Richfield Method, Static Aqueous Solution Test | | Fail | | | | | | |
| ASTM-D130-55T Copper Strip Corrosion: | | | | | | | | |
| 24 hrs. at R.T. | Neg | 4+ | Neg | Neg | Neg | Neg | Neg | Neg |
| 3 hrs. at 180° F | Neg | 4+ | Neg | Neg | Neg | Neg | Neg | Neg |
| 3 hrs. at 210° F | Neg | 4+ | 2 | Neg | Neg | Neg | Neg | Neg |
| Falex E. P. Test (Steel on Steel): | | | | | | | | |
| Max. Load (lbs.) | 1,250 | 4,500 | 4,500 | 4,500 | 4,500 | 4,500 | 4,500 | 4,500 |
| Max. Torque (lbs.-in.) | 46 | 66 | 60 | 72 | 62 | 58 | 70 | 69 |
| Emulsibility Test | Pass | | Pass | | Pass | | Pass | |
| Emulsion Stability Test (24 Hrs.) | Pass | | Pass | | Pass | | Pass | |
| Acid Neutralization (MIL-L-21R60 Sec. 4.4.7) | Fail | Fail | Pass | Pass | Pass | Pass | Pass | Pass |
| Machining SAE 1020 Steel (parts/tool)[3] | 12 | 420 | 1,216 | 1,080 | | | | |
| Machining SAE 4140 Steel parts/tool)[3] | 10 | 380 | 1,008 | 960 | | | | |

[1] Conventional Soluble Oil containing sodium sulphonate and resin soaps.
[2] Premium Cutting Oil—straight mineral oil, sulfurized and chlorinated.
[3] Work performed on 6 spindle Greenlee Automatic-Piece, 20 mm. shot body. Work performed: Cutoff, forming, drilling, champering, reaming, knurling, turning, shaving, skiving.

I claim:
1. A lubricant additive consisting essentially of a reaction product obtained from the following reactants in substantially stoichiometric amounts:
   A. organic fatty acid containing material selected from the group consisting of sulfurized refined tall oil, sulfurized tall oil fatty acids and chlorohydroxystearic acid,
   B. naphthenic acid mixed with reactant A in an amount sufficient to yield a mixture having an acid number of at least 170, and
   C. a mixture of mono-, di-, and triisopropanolamines.

2. A lubricant composition consisting essentially of 70–95% mineral base oil and 5–30% of a reaction product obtained from the following reactants in substantially stoichiometric amounts:
   A. organic fatty acid containing material selected from the group consisting of sulfurized refined tall oil, sulfurized tall oil fatty acids and chlorohydroxystearic acid,
   B. naphthenic acid mixed with reactant A in an amount sufficient to yield a mixture having an acid number of at least 170, and
   C. a mixture of mono-, di- and triisopropanolamines.

3. An emulsified lubricant suitable as a cutting fluid consisting essentially of a major proportion of water and a minor proportion of a lubricant additive consisting essentially of a reaction product obtained from the following reactants in stoichiometric amounts:
   A. organic fatty acid containing material selected from the group consisting of sulfurized refined tall oil, sulfurized tall oil fatty acids and chlorohydroxystearic acid, B. naphthenic acid mixed with reactant A in an amount sufficient to yield a mixture having an acid number of at least 170, and
C. a mixture of mono-, di-, and triisopropanolamines.

References Cited in the file of this patent

UNITED STATES PATENTS

| | | |
|---|---|---|
| 1,799,824 | Kern et al. | Aug. 7, 1931 |
| 1,812,615 | Wall | June 30, 1931 |
| 1,990,365 | Beale | Feb. 5, 1935 |
| 2,238,478 | Ott | Apr. 15, 1941 |
| 2,257,752 | Lincoln et al. | Oct. 7, 1941 |
| 2,320,263 | Carlson et al. | May 25, 1943 |
| 2,345,199 | Hodson | Mar. 28, 1944 |
| 2,474,325 | Rodgers | June 28, 1949 |